(12) United States Patent
Zhang (10) Patent No.: US 11,945,583 B2
(45) Date of Patent: Apr. 2, 2024

(54) METHOD FOR GENERATING SEARCH INFORMATION OF UNMANNED AERIAL VEHICLE AND UNMANNED AERIAL VEHICLE

(71) Applicant: AUTEL ROBOTICS CO., LTD., Guangdong (CN)

(72) Inventor: Tianbao Zhang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 54 days.

(21) Appl. No.: 17/579,694

(22) Filed: Jan. 20, 2022

(65) Prior Publication Data

US 2022/0135221 A1 May 5, 2022

Related U.S. Application Data

(63) Continuation of application No. PCT/CN2020/103559, filed on Jul. 22, 2020.

(30) Foreign Application Priority Data

Jul. 23, 2019 (CN) .......................... 201910666978.4

(51) Int. Cl.
*B64C 39/02* (2023.01)
*B64D 47/08* (2006.01)
(Continued)

(52) U.S. Cl.
CPC ............ *B64C 39/024* (2013.01); *B64D 47/08* (2013.01); *G06F 21/44* (2013.01); *G06V 20/17* (2022.01);
(Continued)

(58) Field of Classification Search
CPC ....... B64C 39/024; B64C 39/02; B64D 47/08; B64D 45/0034; G06F 21/44; G06V 20/17;
(Continued)

(56) References Cited

U.S. PATENT DOCUMENTS

2017/0320569 A1 11/2017 Gordon et al.
2018/0146326 A1* 5/2018 Byrd ....................... G06F 1/163
(Continued)

FOREIGN PATENT DOCUMENTS

CN 103188377 A 7/2013
CN 103957506 A 7/2014
(Continued)

OTHER PUBLICATIONS

The International Search Report dated Oct. 27, 2020; PCT/CN2020/103559 with English Translation.

*Primary Examiner* — Nasim N Nirjhar (57) ABSTRACT

Embodiments of the present invention relate to a method for generating search information of an unmanned aerial vehicle (UAV) and a UAV. The method includes: controlling a gimbal camera apparatus of the UAV to perform surround shooting to obtain character image information when the UAV is in an input locked state; matching the character image information with internal image information of the UAV; and generating the search information of the UAV according to a matching result. Therefore, a user can find the UAV in time according to the search information. In this way, theft is prevented, reducing the user loss.

16 Claims, 6 Drawing Sheets

(51) Int. Cl.
    *B64U 101/30*     (2023.01)
    *G06F 21/44*      (2013.01)
    *G06V 20/17*      (2022.01)
    *G06V 20/58*      (2022.01)
    *G06V 40/16*      (2022.01)
    *H04N 23/695*     (2023.01)

(52) U.S. Cl.
    CPC ............ *G06V 20/58* (2022.01); *G06V 40/172* (2022.01); *H04N 23/695* (2023.01); *B64U 2101/30* (2023.01)

(58) Field of Classification Search
    CPC ...... G06V 20/58; G06V 40/172; G06V 20/56; H04N 23/695; H04N 23/611; B64U 2101/30; B64U 2201/20; G01C 11/00
    See application file for complete search history.

(56) References Cited

U.S. PATENT DOCUMENTS

| | | | |
|---|---|---|---|
| 2019/0266899 A1 | 8/2019 | Ringer et al. | |
| 2020/0027357 A1* | 1/2020 | Zhou | B64C 39/024 |
| 2020/0353894 A1* | 11/2020 | Obaidi | G05D 1/021 |

FOREIGN PATENT DOCUMENTS

| | | |
|---|---|---|
| CN | 105491236 A | 4/2016 |
| CN | 207218924 U | 4/2018 |
| CN | 108076426 A | 5/2018 |
| CN | 108288334 A | 7/2018 |
| CN | 207631492 U | 7/2018 |
| CN | 108399697 A | 8/2018 |
| CN | 108778930 A | 11/2018 |
| CN | 109257178 A | 1/2019 |
| CN | 110375716 A | 10/2019 |

* cited by examiner

FIG. 10 ial Vehicle

METHOD FOR GENERATING SEARCH INFORMATION OF UNMANNED AERIAL VEHICLE AND UNMANNED AERIAL VEHICLE

CROSS-REFERENCE TO RELATED APPLICATIONS

The present application is a continuation of International Application No. PCT/CN2020/103559, filed on Jul. 22, 2020, which claims priority to Chinese patent application No. 201910666978.4, filed on Jul. 23, 2019, which is incorporated herein by reference in its entirety.

TECHNICAL FIELD

The present application relates to the technical field of unmanned aerial vehicles (UAV), and in particular, to a method for generating search information of a UAV and a UAV.

BACKGROUND

With the continuous development of the aerial photography technology of unmanned aerial vehicles (UAV), more and more consumer-level UAVs are also being produced and developed. The UAV is also gradually becoming more popular. There are many ways to control the UAV, for example, by using mobile terminals such as a remote control, a mobile phone, a computer and the like. At present, the price of the UAV with a stable flight, a GPS/optical flow precise positioning, and a three-axis stability augmentation gimbal photography is not low on the market, costing thousands of yuan or even tens of thousands of yuan.

During the implementation of the present invention, the inventor found at least the following problems in the related art. For a user, if the UAV is lost, the damage caused is not only the UAV, but also the precious video/photo material taken. However, the current UAV does not have the function of anti-theft, and the lost UAV cannot be found in time, causing the loss to the user.

SUMMARY

In order to resolve the above technical problems, embodiments of the present invention provide a method for generating search information of an unmanned aerial vehicle (UAV) and a UAV, so as to find the UAV in time and reduce the loss to a user.

In order to resolve the above technical problem, the embodiments of the present invention provide the following technical solutions. A method for generating search information of a UAV, including:
controlling a gimbal camera apparatus of the UAV to perform surround shooting to obtain character image information when the UAV is in an input locked state;
matching the character image information with internal image information of the UAV; and
generating the search information of the UAV according to a matching result.

Optionally, before the controlling a gimbal camera apparatus of the UAV to perform surround shooting to obtain character image information when the UAV is in an input locked state, the method further includes:
acquiring input information and an input number during an input operation performed on the UAV; and
locking the UAV when the input information does not match internal input information of the UAV and the input number exceeds a preset input number.

Optionally, the input information includes password information and/or fingerprint information.

Optionally, after the UAV enters the input locked state, the method further includes: restricting the input operation and issuing a warning tone.

Optionally, the generating the search information of the UAV according to a matching result includes:
acquiring registration information of the UAV when the character image information does not match the internal image information of the UAV; and
generating the search information according to the registration information.

Optionally, the generating the search information according to the registration information includes:
acquiring user contact information in the registration information; and
generating the search information according to the user contact information.

Optionally, the generating the search information of the UAV according to a matching result includes:
acquiring location information of the UAV when the character image information does not match the internal image information of the UAV; and
generating the search information of the UAV according to the location information and the character image information.

Optionally, the acquiring location information of the UAV includes:
acquiring location coordinates of the UAV and map information corresponding to the location coordinates in real time;
generating a movement trajectory of the UAV according to the location coordinates; and
acquiring the location information according to the movement trajectory and the map information.

Optionally, before the controlling a gimbal camera apparatus of the UAV to perform surround shooting to obtain character image information, the method further includes:
acquiring obstacle information within a preset distance range from the UAV;
acquiring a lens orientation of the gimbal camera apparatus; and
controlling, according to the obstacle information and the lens orientation, the gimbal camera apparatus of the UAV to perform the surround shooting to obtain the character image information.

Optionally, after the generating the search information of the UAV according to a matching result, the method further includes:
acquiring registration information of the UAV; and
sending the search information to a mobile terminal corresponding to the registration information.

In order to resolve the above technical problem, the embodiments of the present invention provide the following technical solutions. A UAV, including:
a fuselage;
an arm, connected to the fuselage;
a power apparatus, disposed on the arm and configured to provide power for flight of the UAV;
a gimbal camera apparatus, configured to perform surround shooting;
at least one processor; and
a memory, communicatively connected to the at least one processor, wherein the memory stores an instruction executable by the at least one processor, the instruction, when executed by the at least one processor, causing the at least one processor to perform the method for generating search information of a UAV.

Compared with the prior art, according to the method for generating search information of a UAV provided in the embodiments of the present invention, the gimbal camera apparatus of the UAV is first controlled to perform surround shooting to obtain character image information when the UAV is in the input locked state; then the character image information matches the internal image information of the UAV; and finally the search information of the UAV is generated according to the matching result, so that the user can find the UAV according to the search information in time. In this way, theft is prevented, reducing the user loss.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component must have a particular orientation or must be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the present invention are the same as that usually understood by a person skilled in the technical field to which the present invention belongs. In the present invention, terms used in the specification of the present invention are merely intended to describe objectives of the specific embodiments, but are not intended to limit the present invention. A term "and/or" used in this specification includes any or all combinations of one or more related listed items.

In addition, technical features involved in different embodiments of the present invention described below may be combined together if there is no conflict.

The embodiments of the present invention provide a method and apparatus for generating search information of a UAV. According to the method and the apparatus, a gimbal camera apparatus of the UAV is controlled to perform surround shooting to obtain character image information; then the character image information matches the internal image information of the UAV; and finally the search information of the UAV is generated according to the matching result, so that the user can find the UAV according to the search information in time. In this way, theft is prevented, reducing the user loss.

The following illustrates an application environment of the method and apparatus for generating search information of a UAV.

Figure 1:
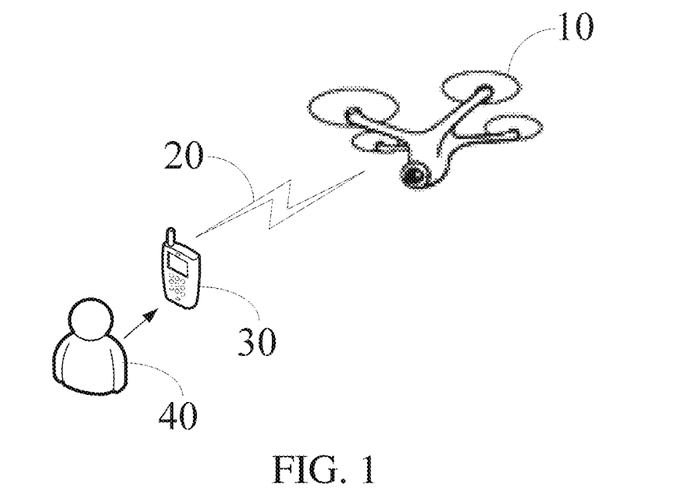
FIG. 1 is a schematic diagram of an application environment according to an embodiment of the present invention.

FIG. 1 is a schematic diagram of an application environment of a method and apparatus for generating search information of a UAV according to an embodiment of the present invention. As shown in FIG. 1, the application scenario includes a UAV 10, a wireless network 20, a remote control apparatus, 30 and a user 40. The user 40 may use the remote control apparatus 30 to control the UAV 10 through the wireless network.

The UAV 10 may be a UAV driven by any type of power, including but not limited to a rotary-wing UAV, a fixed-wing UAV, an umbrella-wing UAV, a flapping-wing UAV, a helicopter model and the like.

The UAV 10 may have a corresponding volume or power according to actual conditions, so as to provide a load capacity, a flight speed and a flight range that can meet use requirements. One or more functional modules may be added to the UAV 10 to enable the UAV 10 to implement corresponding functions.

For example, in this embodiment, the UAV 10 is equipped with a gimbal camera apparatus. The gimbal camera apparatus may perform surround shooting, that is, the gimbal camera apparatus can capture image information from various angles around the UAV.

The gimbal camera apparatus includes an electronic compass, a global positioning system (GPS) chip and a processor. The electronic compass is configured to acquire a lens orientation of the gimbal camera apparatus. The GPS chip is configured to acquire location information of the gimbal camera apparatus, and the location information of the gimbal camera apparatus includes latitude and longitude of the gimbal camera apparatus. The processor is configured to: receive a shooting instruction, the shooting instruction including location information of a target, and the location information of the target including longitude and latitude of the target; and adjust, according to the location information of the target, the location information of the gimbal camera apparatus acquired by the GPS chip and the lens orientation of the gimbal camera apparatus acquired by the electronic compass, a shooting angle of the gimbal camera apparatus to shoot image information from various angles around the UAV.

The UAV 10 includes at least one main control chip, which serves as a control core of the UAV 10 for flight and data transmission to integrate one or more modules to execute corresponding logic control programs.

For example, in some embodiments, the main control chip may include the apparatus for generating search information of a UAV for searching the UAV.

The remote control apparatus 30 may be any type of smart apparatus configured to establish a communication connection to the UAV 10, such as a mobile phone, a tablet computer, a notebook computer, other mobile control terminals or the like.

The remote control apparatus 30 may further be equipped with one or more different user interactive apparatuses for collecting instructions from the user 40 or display and feedback information to the user 40.

These interactive apparatuses include but are not limited to: a button, a display screen, a touch screen, a speaker and a remote control operating rod. For example, the remote control apparatus 30 may be equipped with a touch display screen, and the remote control instruction of the user 40 on the UAV 10 is received by using the touch display screen.

In some embodiments, the existing image visual processing technology may further be fused between the UAV 10 and the remote control apparatus 30 to further provide more intelligent services. For example, the UAV 10 may collect images through a dual-light camera, and the remote control apparatus 30 analyzes the images, so as to implement gesture control for the UAV 10 by the user 40.

The wireless network 20 may be a wireless communication network configured to establish a data transmission channel between two nodes based on any type of data transmission principle, for example, a Bluetooth network, a Wi-Fi network, a wireless cellular network, or a combination thereof located in different signal frequency bands.

Figure 2:
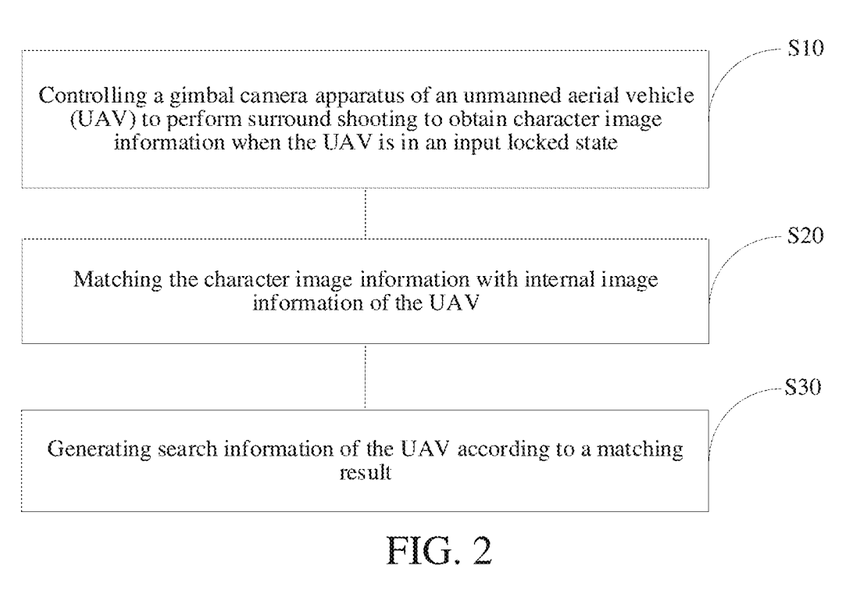
FIG. 2 is a schematic flowchart of a method for generating search information of an unmanned aerial vehicle (UAV) according to one embodiment of the present invention.

FIG. 2 is an embodiment of a method for generating search information of a UAV according to an embodiment of the present invention. The method may be performed by the UAV in FIG. 1.

Specifically, referring to FIG. 2, the method may include but is not limited to the following steps.

S10: Controlling a gimbal camera apparatus of the UAV to perform surround shooting to obtain character image information when the UAV is in an input locked state.

Specifically, the input locked state means that an input operation is prohibited from being performed on an input apparatus (an input key, a display screen, a touch screen and the like) of the UAV. For example, when a login password entered by the user a plurality of times is different from a preset password, the UAV is locked. At this point, the UAV is in the input locked state, and the user is prohibited from continuing to enter the login password. For another example, when a fingerprint image entered by the user a plurality of times is different from a preset fingerprint image, the UAV is locked. At this point, the UAV is in the input locked state, and the user is prohibited from continuing to enter the fingerprint image.

Specifically, the gimbal camera apparatus may perform surround shooting. The surround shooting includes horizontal surround shooting and vertical surround shooting. That is, the gimbal camera apparatus can capture image information from various angles around the UAV.

The gimbal camera apparatus includes an electronic compass, a global positioning system (GPS) chip and a processor. The electronic compass is configured to acquire a lens orientation of the gimbal camera apparatus. The GPS chip is configured to acquire location information of the gimbal camera apparatus, and the location information of the gimbal camera apparatus includes latitude and longitude of the gimbal camera apparatus. The processor is configured to: receive a shooting instruction, the shooting instruction including location information of a target, and the location information of the target including longitude and latitude of the target; and adjust, according to the location information of the target, the location information of the gimbal camera apparatus acquired by the GPS chip and the lens orientation of the gimbal camera apparatus acquired by the electronic compass, a shooting angle of the gimbal camera apparatus to shoot image information from various angles around the UAV.

Specifically, when the UAV is in the input locked state, it indicates that the UAV is probably being operated by an illegal user at this time, and the UAV is at risk of loss. Therefore, the gimbal camera apparatus of the UAV is controlled to perform surround shooting to obtain the character image information in time. If the UAV is being operated by the illegal user, the acquired character image information is the character image information of the illegal user.

S20: Matching the character image information with internal image information of the UAV.

Specifically, after a legal user purchases a UAV, internal image information is required to be entered in advance. The internal image information may be used for turning on the UAV, or may be used for searching for the UAV. The internal image information includes face image information of the legal user and face image information of an associated user. The character image information matches the internal image information of the UAV to determine whether the UAV is being operated by a legal user, an associated user or an illegal user.

It should be noted that the legal user is an owner of the UAV, and there may be a plurality of legal users.

The associated user is a user associated with the legal user, for example, the associated user may be relatives and friends of the legal user, and so on.

The illegal user refers to other unfamiliar users other than the legal user and the associated user, for example, a user who picks up or steals the UAV.

Specifically, the image information matching means identifying homonymy points between two or more images by using a specific matching algorithm. For example, in two-dimensional image matching, a window center point corresponding to a largest correlation coefficient in a search area is used as the homonymy point by comparing correlation coefficients of windows of a same size in a target area and the search area. The essence is the optimal search problem using the matching criteria under the condition of primitive similarity. The image information matching includes gray-scale matching and/or feature matching.

The grayscale matching is to determine a correspondence between the character image information and the internal image information by means of similarity measurement, such as a correlation function, a covariance function, a sum of squares of difference, a sum of absolute difference and a measurement extremum.

The feature matching is to first preprocess the image information to extract high-level features of the image information, and then establish a matching correspondence between the character image information and the internal image information. The commonly used feature primitives include a point feature, an edge features and a regional feature. The feature matching uses a large number of mathematical operations such as matrix operations, gradient solving, Fourier transform, Taylor expansion and the like.

A commonly used feature extraction and matching method includes: a statistical method, a geometric method, a model method, a signal processing method, a boundary feature method, a Fourier shape description method, a geometric parameter method, a shape invariant moment method and the like.

S30: Generating search information of the UAV according to a matching result. Specifically, after the character image information matches the internal image information of the UAV, the character image information may be the character image information of the legal user, or may be the character image information of the associated user, or may be the character image information of the illegal user. Furthermore, different search information of the UAV may be generated according to different matching results.

The search information may include a geographic location information, a path information, a prompt information and so on.

For example, when a child at home is playing with the UAV, after the character image information matches the internal image information of the UAV, the character image information is the character image information of the associated user. Then the search information includes only the prompt information, and the prompt information is used for prompting the legal user that one associated user is operating the UAV.

For another example, when the character image information matches the internal image information of the UAV, and the character image information is the character image information of the illegal user, the search information includes the geographic location information, the path information, and the prompt information and the like.

The embodiments of the present invention provide a method and apparatus for generating search information of a UAV. According to the method and the apparatus, a gimbal camera apparatus of the UAV is controlled to perform surround shooting to obtain character image information; then the character image information matches the internal image information of the UAV; and finally the search information of the UAV is generated according to the matching result, so that the user can find the UAV according to the search information in time. In this way, theft is prevented, reducing the user loss.

Figure 3:
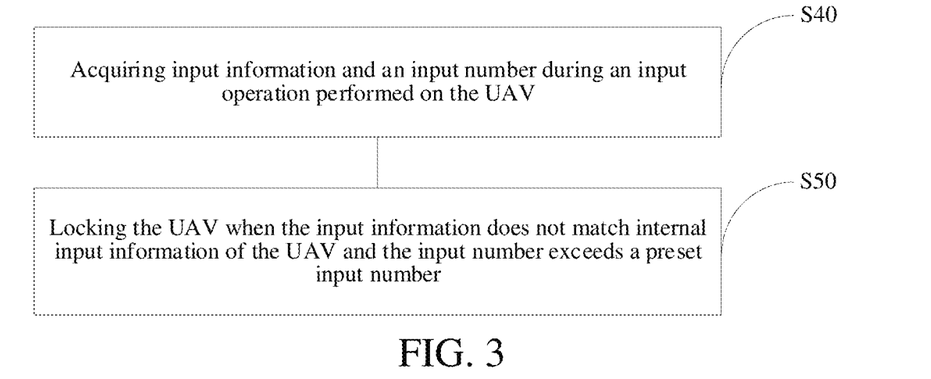
FIG. 3 is a schematic flowchart of the method for generating search information of a UAV according to another embodiment of the present invention.

In order to better determine the locked state of the UAV before controlling the gimbal camera apparatus of the UAV to perform surround shooting, in some embodiments, referring to FIG. 3, the method further includes the following steps.

S40: Acquiring input information and an input number during an input operation performed on the UAV.

The input information includes password information and/or fingerprint information.

After the user enters the password information or the fingerprint information, the UAV performs verification, which is denoted as one input. That is, the input number is a number of times the user enters password information or fingerprint information and verification is performed. For example, the user enters the password and clicks verification or the UAV automatically verifies, which is denoted as one input.

S50: Locking the UAV when the input information does not match internal input information of the UAV and the input number exceeds a preset input number.

Specifically, the internal input information is information that needs to be entered in advance for verification after the legal user purchases the UAV, and the internal image information is only used for the legal user to turn on the UAV. The internal image information includes internal password information and/or internal fingerprint information that are/is entered in advance by the legal user for verification.

The preset input number is a total number of times after the user is allowed to enter password information or fingerprint information and the UAV performs verification.

When the password information and/or the fingerprint information matched(es) with the internal input information of the UAV, the UAV can be started.

When the password information and/or the fingerprint information do/does not match the internal input information of the UAV, and the input number exceeds the preset input number, the UAV is locked.

For example, the preset input number is 5 times. When the user enters the password information 5 times and the entered password every time does not match the internal input password in the internal input information of the UAV, the UAV is locked.

Figure 4:
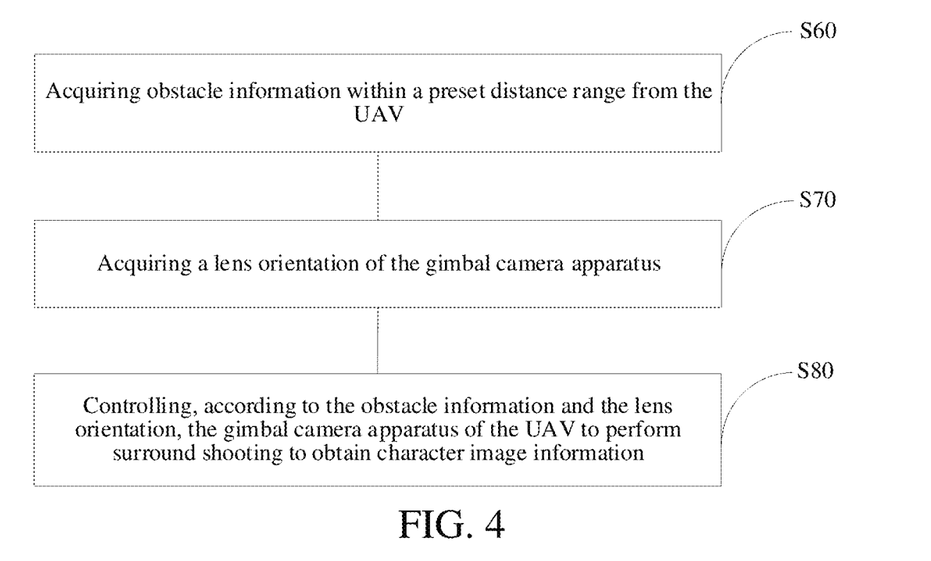
FIG. 4 is a schematic flowchart of a method for generating search information of a UAV according to yet another embodiment of the present invention.

In order to better obtain the character image information before controlling the gimbal camera apparatus of the UAV to perform surround shooting, in some embodiments, referring to FIG. 4, the method further includes the following steps.

S60: Acquiring obstacle information within a preset distance range from the UAV.

The obstacle information is location coordinates, relative distances, heights and the like of the obstacle and the UAV.

The preset distance range refers to a distance range between the user and the UAV when the user operates the UAV. The relative distance between the user and the UAV when the user is operating the UAV may be determined first under an actual condition. In this embodiment, it is determined that the relative distance ranges from 60 cm to 120 cm by means of a large number of experimental measurements. Then the relative distance between the user and the UAV is used as the radius to obtain the preset distance range. That is to say, within the preset distance range, if the obstacle information is detected, it is determined that the obstacle information is the user (the illegal user, the associated user or the legal user).

Specifically, the obstacle information within the preset distance range from the UAV may be acquired by disposing an infrared obstacle detector on the UAV.

S70: Acquiring a lens orientation of the gimbal camera apparatus.

Specifically, the lens orientation of the gimbal camera apparatus may be acquired by using the electronic compass built into the UAV.

S80: Controlling, according to the obstacle information and the lens orientation, the gimbal camera apparatus of the UAV to perform the surround shooting to obtain the character image information.

Specifically, the optimal shooting path is determined according to the obstacle information and the lens orientation, so as to shorten the shooting time. When the user operating the UAV is the illegal user, the character image information is acquired before the illegal user becomes aware.

In order to better remind the user, after the UAV enters the input locked state, in some embodiments, the method further includes the following step:

restricting the input operation and issuing a warning tone.

Specifically, when the password information and/or fingerprint information do/does not match the internal input information of the UAV, and the input number exceeds the preset input number, the input location (a password box and a fingerprint input area) of the interactive apparatus corresponding to the input operation is locked. In this way, the password information and/or the fingerprint information cannot be inputted, and the buzzer is caused to buzz intermittently. If the user at this point is an illegal user and the legal user is nearby, the buzzing serves as a reminder for the legal user.

In order to send the generated search information to the user in time, so that the user can find the lost UAV in time according to the search information, in some embodiments, the method further includes the following step:

acquiring registration information of the UAV.

Specifically, the registration information is account information filled in when the user applies for an account after purchasing the UAV. The registration information is associated with a serial number of the UAV, that is, one UAV corresponds to one piece of registration information, so that the registration information of the legal user can be found in association with the serial number of the UAV.

The registration information includes a user name, a phone number, an email address, emergency contact information and the like.

The search information is sent to a mobile terminal corresponding to the registration information.

Specifically, the UAV has an internal customer identification module (SIM card). Therefore, the UAV may send a text message to the user through the internal SIM card to remind the user that the UAV is being operated by an illegal person or the UAV may have been lost, so that the user can take measures in time to find the UAV.

Figure 5:
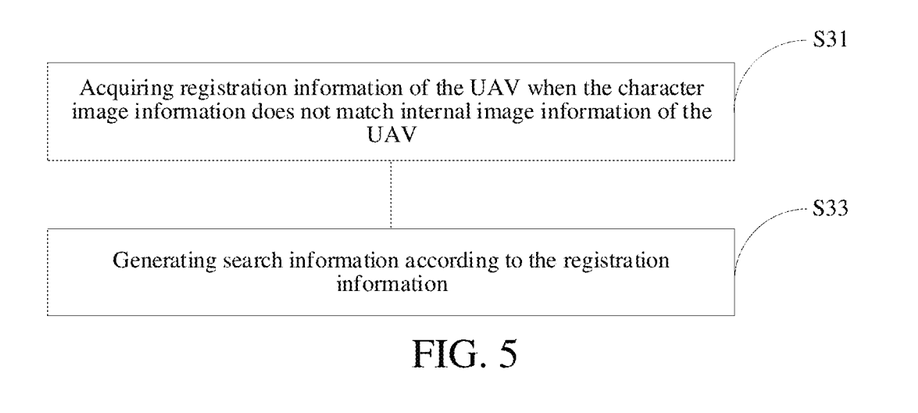
FIG. 5 is a schematic flowchart according to one embodiment of S30 in FIG. 4.

In order to better generate the search information of the UAV according to the matching result, in some embodiments, referring to FIG. 5, S30 includes the following steps.

S31: Acquiring registration information of the UAV when the character image information does not match the internal image information of the UAV.

Specifically, when the character image information does not match the internal image information of the UAV, it indicates that the UAV is being operated by an illegal user, and the UAV is at risk of being lost.

Specifically, the registration information is account information filled in when the legal user applies for an account after purchasing the UAV. The registration information is associated with a serial number of the UAV, that is, one UAV corresponds to one piece of registration information, so that the registration information of the legal user can be found in association with the serial number of the UAV.

The registration information includes a user name, a phone number, an email address, emergency contact information and the like.

S33: Generating the search information according to the registration information.

Specifically, the serial number of the UAV is associated with the registration information, and the corresponding search information is generated according to the content of the registration information, so as to remind the legal user that the UAV is being operated by an illegal user or the UAV may have been lost.

For example, the serial number of the UAV is associated with the registration information, and user contact information in the registration information is first acquired according to the registration information. The user contact information includes a phone number, an email address, emergency contact information or the like. Then the search information is generated according to the user contact information. The search information is prompt information to remind the user that the UAV is being operated by an illegal person or that the UAV may have been lost, so that the user takes measures in time to find the UAV. For example, the search information may be "The UAV is being operated illegally, please pay attention!", "The UAV may have been lost!" or the like.

Further, a text message is sent to a legal user by the customer identification module (SIM card) built into the UAV to remind the user that the UAV is being operated by an illegal person or that the UAV may have been lost, so that the user can take measures in time to find the UAV.

Figure 6:
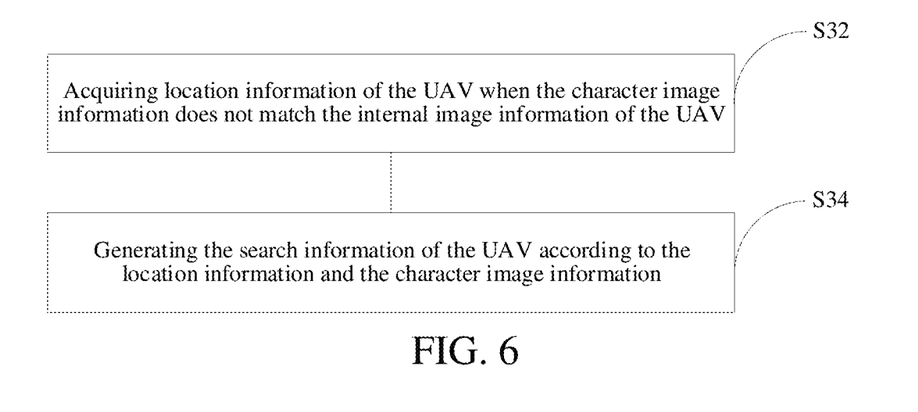
FIG. 6 is a schematic flowchart according to another embodiment of S30 in FIG. 4.

In order to better generate the search information of the UAV according to the matching result, in some embodiments, referring to FIG. 6, S30 includes the following steps.

S32: Acquiring location information of the UAV when the character image information does not match the internal image information of the UAV.

Specifically, when the character image information does not match the internal image information of the UAV, it indicates that the UAV may be lost. Therefore, it is necessary to acquire the location information of the UAV to help the legal user find the UAV.

Specifically, the location information of the UAV may be acquired by using the global positioning system (GPS) chip provided in the UAV.

S34: Generating the search information of the UAV according to the location information and the character image information.

Specifically, the location information and the character image information are combined to generate the search information. That is to say, the search information includes location information and character image information, which is more conducive for the legal user to find the UAV. For example, if the legal user is near the lost UAV, the legal user can find the UAV more timely according to the character image information of the illegal user and the location information of the UAV. If the search information includes only the location information, the location information usually acquired by the GPS has a certain deviation. If there are a plurality of strangers within the deviation range, it is also difficult to determine the illegal user possessing the UAV. If the search information includes only character image information, the location information of the UAV cannot be accurately located, and the illegal user possessing the UAV cannot be determined either due to the excessively large search range. Therefore, the UAV can be found in time by combining the character image information of the illegal user and the location information of the UAV as search information.

Figure 7:
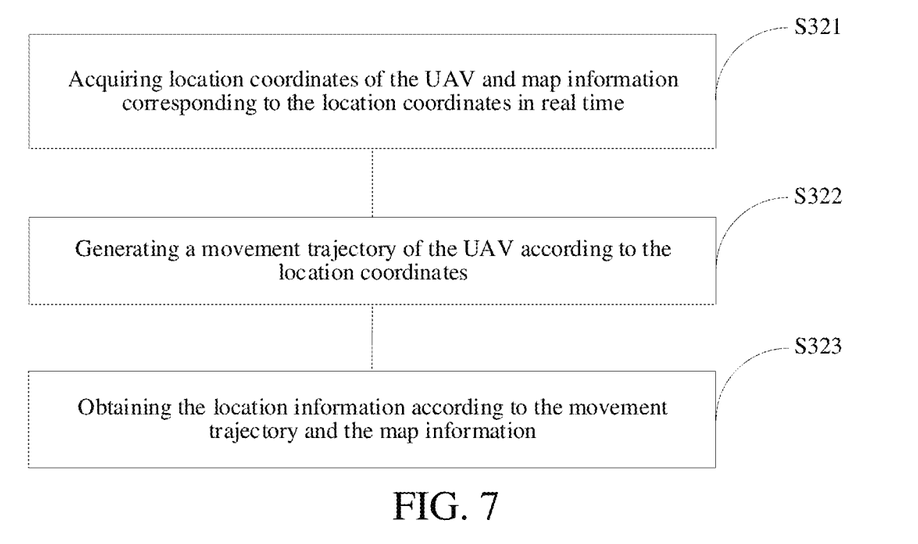
FIG. 7 is a schematic flowchart of S32 in FIG. 6.

In order to better acquire the location information of the UAV, in some embodiments, referring to FIG. 7, S32 includes the following steps.

S321: Acquiring location coordinates of the UAV and map information corresponding to the location coordinates in real time.

The location coordinates are latitude and longitude of the UAV, and when the location of the UAV changes, a plurality of the location coordinates may be obtained, for example, location coordinates (x1, y1), (x2, y2) (x3, y3), (x4, y4), (x5, y5), (x6, y6) and the like.

The map information is surrounding environment information corresponding to each of the location coordinates.

S322: Generating a movement trajectory of the UAV according to the location coordinates. The movement trajectory of the UAV may be generated according to the acquired a plurality of location coordinates. Specifically, a time point corresponding to each of the location coordinates is first acquired, and then the location coordinates corresponding to each time point are connected according to a sequence of the time points to generate the movement trajectory of the UAV.

For example, the time point corresponding to the location coordinates (x1, y1) is t1, the time point corresponding to the location coordinates (x2, y2) is t2, the time point corresponding to the location coordinates (x3, y3) is t3, the time point corresponding to the location coordinates (x4, y4) is t4, the time point corresponding to the location coordinates (x5, y5) is t5, and the time point corresponding to the location coordinates (x6, y6) is t6. If a plurality of the time points are arranged as t1, t2, t3, t4, t5 and t6 in chronological order, then the location coordinates (x1, y1), (x2, y2), (x3, y3), (x4, y4), (x5, y5) and (x6, y6) corresponding to each time point are connected to obtain the movement trajectory of the UAV.

S323: Acquiring the location information according to the movement trajectory and the map information.

Specifically, the movement trajectory includes a plurality of location coordinates, and then the map information corresponding to the plurality of location coordinates is combined to obtain the location information. The map information may be acquired by an existing map application, such as Baidu Map, Gaode Map and the like.

It should be noted that in each of the foregoing embodiments, there is not necessarily a specific sequence between the steps. A person of ordinary skill in the art may understand, according to the description of the embodiments of the present application, that in different embodiments, the foregoing steps may be performed in different orders, that is, the steps may be performed in parallel, may be performed interchangeably, or the like.

Figure 8:
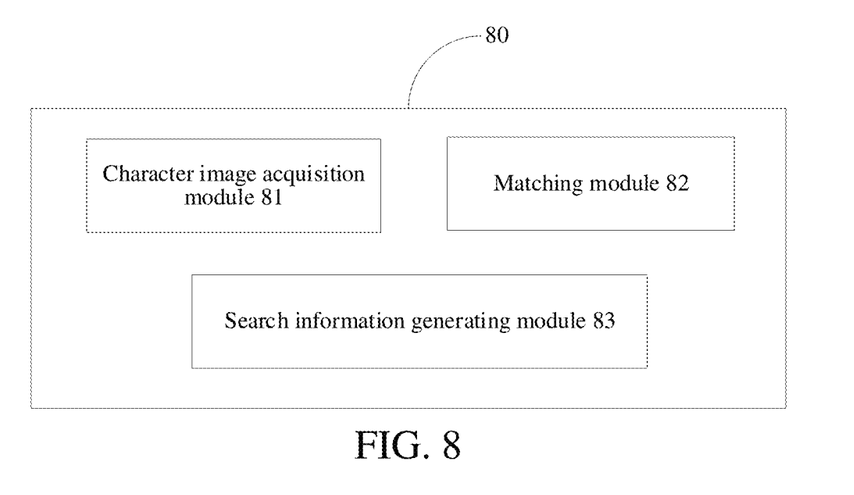
FIG. 8 is a structural block diagram of an apparatus for generating search information of a UAV according to one embodiment of the present invention.

As another aspect of the embodiments of the present application, an embodiment of the present application provides an apparatus 80 for generating search information of a UAV, applicable to a UAV 10. Referring to FIG. 8, the apparatus 80 for generating search information of a UAV includes: a character image acquisition module 81, a matching module 82 and a search information generating module 83.

The character image acquisition module 81 is configured to control a gimbal camera apparatus of the UAV to perform surround shooting to obtain character image information when the UAV is in an input locked state.

The matching module 82 is configured to generate search information of the UAV according to a matching result.

The search information generating module 83 is configured to acquire an infrared control instruction fed back by infrared information.

Therefore, in this embodiment, the character image information is obtained by controlling the gimbal camera apparatus of the UAV to perform surround shooting; then the character image information matches the internal image information of the UAV; and finally the search information of the UAV is generated according to the matching result, so that the user can find the UAV according to the search information in time. In this way, theft is prevented, reducing the user loss.

Figure 9:
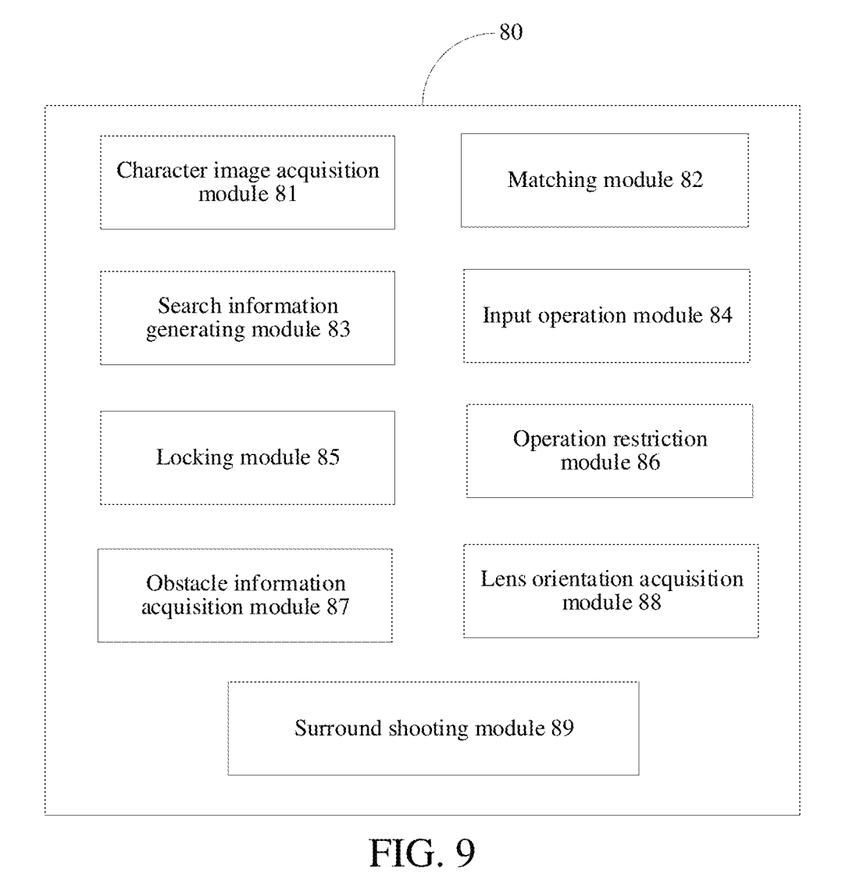
FIG. 9 is a structural block diagram of an apparatus for generating search information of a UAV according to another embodiment of the present invention.

Referring to FIG. 9, in some embodiments, the apparatus for generating search information of a UAV further includes an input operation module 84, a locking module 85 and an operation restriction module 86.

The input operation module 84 is configured to acquire input information and an input number when an input operation is performed on the UAV.

The locking module 85 is configured to lock the UAV when the input information does not match internal input information of the UAV and the input number exceeds a preset input number.

The operation restriction module 86 is configured to restrict the input operation and issue a warning tone.

Referring to FIG. 9, in some embodiments, the apparatus for generating search information of a UAV further includes an obstacle information acquisition module 87, a lens orientation acquisition module 88 and a surround shooting module 89.

The obstacle information acquisition module 87 is configured to acquire obstacle information within a preset distance range from the UAV.

The lens orientation acquisition module 88 is configured to acquire a lens orientation of the gimbal camera apparatus.

The surround shooting module 89 is configured to control, according to the obstacle information and the lens orientation, the gimbal camera apparatus of the UAV to perform the surround shooting to obtain the character image information.

The search information generating module 83 includes a registration information acquisition unit and a first search information generating unit.

The registration information acquisition unit is configured to acquire registration information of the UAV when the character image information does not match the internal image information of the UAV.

The first search information generating unit is configured to generate the search information according to the registration information.

The search information generating module 83 further includes a location information acquisition unit and a second search information generating unit.

The location information acquisition unit is configured to acquire location information of the UAV when the character image information does not match the internal image information of the UAV.

The second search information generating unit is configured to generate the search information of the UAV according to the location information and the character image information.

The location information acquisition unit includes a location acquisition subunit, a movement trajectory generating unit and a location information generating subunit.

The location acquisition subunit acquires location coordinates of the UAV and map information corresponding to the location coordinates in real time.

The movement trajectory generating unit generates a movement trajectory of the UAV according to the location coordinates.

The location information generating subunit obtains the location information according to the movement trajectory and the map information.

Figure 10:
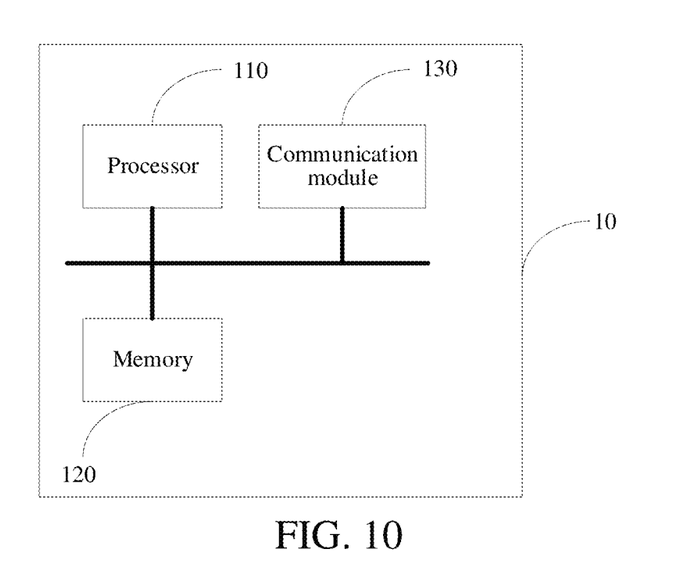
FIG. 10 is a structural block diagram of a UAV according to one embodiment of the present invention.

FIG. 10 is a schematic structural diagram of a UAV 10 according to an embodiment of the present application. The UAV 10 may be any type of unmanned vehicle, which can perform the method for generating search information of a UAV provided in the above corresponding method embodiment, or run the apparatus 80 for generating search information of a UAV provided in the above corresponding apparatus embodiment.

The UAV 10 includes a fuselage, an arm, a power apparatus, a gimbal camera apparatus, at least one processor and a memory communicatively connected to the at least one processor.

The arm is connected to the fuselage, and the power apparatus is disposed on the arm for providing flight power to the UAV.

The gimbal camera apparatus is configured to perform surround shooting. Specifically, the gimbal camera apparatus includes an electronic compass, a global positioning system (GPS) chip and a processor. The electronic compass is configured to acquire a lens orientation of the gimbal camera apparatus. The GPS chip is configured to acquire location information of the gimbal camera apparatus, and the location information of the gimbal camera apparatus includes latitude and longitude of the gimbal camera apparatus. The processor is configured to: receive a shooting instruction, the shooting instruction including location information of a target, and the location information of the target including longitude and latitude of the target; and adjust, according to the location information of the target, the location information of the gimbal camera apparatus acquired by the GPS chip and the lens orientation of the gimbal camera apparatus acquired by the electronic compass, a shooting angle of the gimbal camera apparatus to shoot image information from various angles around the UAV.

A communication connection is established between any two of the processor 110, the memory 120 and the communication module 130 by using a bus.

The processor 110 may be any type of processor 110 having one or more processing cores. The processor may perform single-threaded or multi-threaded operations and is configured to analyze instructions to execute operations such as acquiring data, executing logical operation functions, delivering operation processing results and the like.

As a non-transitory computer-readable storage medium, the memory 120 may be configured to store a non-transitory software program, a non-transitory computer executable program and a module, such as a program instruction/module corresponding to the method for generating search information of a UAV in the embodiment of the present invention (for example, the character image acquisition module 81, the matching module 82, the search information generating module 83, the input operation module 84, the locking module 85, the operation restriction module 86, the obstacle information acquisition module 87, the lens orientation acquisition module 88 and the surround shooting module 89 shown in FIG. 9). The processor 110 executes various functional applications and data processing of the apparatus 80 for generating search information of a UAV by running the non-transitory software program, the instruction and the module stored in the memory 120, thereby implementing the method for generating search information of a UAV in any of the foregoing method embodiments.

The memory 120 may include a program storage area and a data storage area. The program storage area may store an operating system and an application program required by at least one function. The data storage area may store data created according to the use of the apparatus 80 for generating search information of a UAV and the like. In addition, the memory 120 may include a high-speed random access memory, and may further include a non-transitory memory, for example, at least one magnetic disk memory device, a flash memory device or other non-transitory solid-state memory devices. In some embodiments, the memory 120 optionally includes memories remotely disposed relative to the processor 110. These remote memories may be connected to the UAV 10 via a network. Examples of the network include, but are not limited to, the Internet, an intranet, a local area network, a mobile communication network, and a combination thereof.

The memory 120 stores an instruction that may be executed by the at least one processor 110. The at least one processor 110 is configured to execute the instruction to implement the method for generating search information of a UAV in any of the foregoing method embodiments, for example, perform the foregoing method steps 10, 20, 30, 40, 50, 60, 70, 80 and the like to implement functions of modules 81-89 in FIG. 9.

The communication module 130 is a functional module configured to establish a communication connection and provide a physical channel. The communication module 130 may be any type of wireless or wired communication module 130, including but not limited to a Wi-Fi module, a Bluetooth module or the like.

Further, an embodiment of the present invention further provides a non-transitory computer-readable storage medium. The non-transitory computer-readable storage medium stores a computer-executable instruction. The computer-executable instruction is executed by one or more processors 110, for example, executed by one processor 110 in FIG. 10, so that the one or more processors 110 perform the method for generating search information of a UAV in any of the foregoing method embodiments, for example, perform the foregoing method steps 10, 20, 30, 40, 50, 60, 70, 80 and the like to implement functions of modules 81-89 in FIG. 9.

The foregoing described device embodiments are merely examples. The units described as separate parts may or may not be physically separate, and the parts displayed as units may or may not be physical units, may be located in one location, or may be distributed on a plurality of network units. Some or all of the modules may be selected according to actual needs to achieve the objectives of the solutions of the embodiments.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing embodiment methods may be implemented by a computer program in a computer program product instructing relevant hardware. The computer program may be stored in a non-transitory computer-readable storage medium, and the computer program includes program instructions. When the program instructions are executed by a related device, the related device may be enabled to execute the procedures of the foregoing method embodiments The storage medium may be a magnetic disk, an optical disc, a read-only memory (ROM), a RAM or the like.

The above products may perform the method for generating search information of a UAV provided in the embodiment of the present invention, and have the corresponding functional modules for performing the method for generating search information of a UAV and beneficial effects. For technical details that are not described in detail in this embodiment, reference may be made to the method for generating search information of a UAV provided in the embodiments of the present invention.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The foregoing descriptions are merely preferred embodiments of the present invention, but are not intended to limit the present invention. Any modification, equivalent replacement, or improvement made within the spirit and principle of the present invention shall fall within the protection scope of the present invention.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for generating search information of an unmanned aerial vehicle (UAV), comprising:
controlling a gimbal camera apparatus of the UAV to perform surround shooting to obtain character image information when the UAV is in an input locked state;
matching the character image information with internal image information of the UAV; and
generating the search information of the UAV according to a matching result;
wherein the generating the search information of the UAV according to a matching result comprises:
acquiring location information of the UAV when the character image information does not match the internal image information of the UAV; and
generating the search information of the UAV according to the location information and the character image information;
wherein the acquiring location information of the UAV comprises:
acquiring location coordinates of the UAV and map information corresponding to the location coordinates in real time;
generating a movement trajectory of the UAV according to the location coordinates; and
acquiring the location information according to the movement trajectory and the map information.

2. The method according to claim 1, wherein before the controlling a gimbal camera apparatus of the UAV to perform surround shooting to obtain character image information when the UAV is in an input locked state, the method further comprises:
acquiring input information and an input number during an input operation performed on the UAV; and
locking the UAV when the input information does not match internal input information of the UAV and the input number exceeds a preset input number.

3. The method according to claim 2, wherein
the input information comprises password information and/or fingerprint information.

4. The method according to claim 2, wherein after the UAV enters the input locked state, the method further comprises:
restricting the input operation and issuing a warning tone.

5. The method according to claim 1, wherein the generating the search information of the UAV according to a matching result comprises:
acquiring registration information of the UAV when the character image information does not match the internal image information of the UAV; and
generating the search information according to the registration information.

6. The method according to claim 5, wherein the generating the search information according to the registration information
comprises:
acquiring user contact information in the registration information; and
generating the search information according to the user contact information.

7. The method according to claim 1, wherein before the controlling a gimbal camera apparatus of the UAV to perform surround shooting to obtain character image information, the method further comprises:
acquiring obstacle information within a preset distance range from the UAV;
acquiring a lens orientation of the gimbal camera apparatus; and
controlling, according to the obstacle information and the lens orientation, the gimbal camera apparatus of the UAV to perform the surround shooting to obtain the character image information.

8. The method according to claim 1, wherein after the generating the search information of the UAV according to a matching result, the method further comprises:
acquiring registration information of the UAV; and
sending the search information to a mobile terminal corresponding to the registration information.

9. An unmanned aerial vehicle (UAV), comprising:
a fuselage;
an arm, connected to the fuselage;
a power apparatus, disposed on the arm and configured to provide power for flight of the UAV;
a gimbal camera apparatus, configured to perform surround shooting;
at least one processor; and
a memory, communicatively connected to the at least one processor, wherein the memory stores an instruction executable by the at least one processor, the instruction, when executed by the at least one processor, causing the at least one processor to perform:
control a gimbal camera apparatus of the UAV to perform surround shooting to obtain character image information when the UAV is in an input locked state;
match the character image information with internal image information of the UAV; and
generate the search information of the UAV according to a matching result;
the processor is further configured to:
acquire location information of the UAV when the character image information does not match the internal image information of the UAV; and
generate the search information of the UAV according to the location information and the character image information;
acquire location coordinates of the UAV and map information corresponding to the location coordinates in real time;
generate a movement trajectory of the UAV according to the location coordinates; and
acquire the location information according to the movement trajectory and the map information.

10. The UAV according to claim 9, wherein before the controlling a gimbal camera apparatus of the UAV to perform surround shooting to obtain character image information when the UAV is in an input locked state, the processor is further configured to:
acquire input information and an input number during an input operation performed on the UAV; and
lock the UAV when the input information does not match internal input information of the UAV and the input number exceeds a preset input number.

11. The UAV according to claim 10, wherein the input information comprises password information and/or fingerprint information.

12. The UAV according to claim 10, wherein after the UAV enters the input locked state, the processor is further configured to:
restrict the input operation and issuing a warning tone.

13. The UAV according to claim 9, the processor is further configured to:
acquire registration information of the UAV when the character image information does not match the internal image information of the UAV; and
generate the search information according to the registration information.

14. The UAV according to claim 13, the processor is further configured to:
acquire user contact information in the registration information; and
generate the search information according to the user contact information.

15. The UAV according to claim 9, wherein before the controlling a gimbal camera apparatus of the UAV to perform surround shooting to obtain character image information, the processor is further configured to:
acquire obstacle information within a preset distance range from the UAV;
acquire a lens orientation of the gimbal camera apparatus; and
control, according to the obstacle information and the lens orientation, the gimbal camera apparatus of the UAV to perform the surround shooting to obtain the character image information.

16. The UAV according to claim 9, wherein after the generating the search information of the UAV according to a matching result, the processor is further configured to:
acquire registration information of the UAV; and
send the search information to a mobile terminal corresponding to the registration information.

* * * * *